United States Patent
Spencer et al.

(10) Patent No.: US 6,244,128 B1
(45) Date of Patent: Jun. 12, 2001

(54) STEERING WHEEL IMPACT POSITIONING SYSTEM

(76) Inventors: Joseph C. Spencer, 9971 Marias Dr., Coldwater, MI (US) 49036; Corbin G. Glidden, 2212 Edgewood Dr., Kalamazoo, MI (US) 49008; Brian C. Bowerman, 67 W. Chicago St., Quincy, MI (US) 49082; Patrick D. Gaukel, 466 Cranson Rd., Bronson, MI (US) 49028

(*) Notice: Subject to any disclaimer, the term of this patent is extended or adjusted under 35 U.S.C. 154(b) by 0 days.

(21) Appl. No.: 09/404,942

(22) Filed: Sep. 23, 1999

Related U.S. Application Data
(60) Provisional application No. 60/101,789, filed on Sep. 25, 1998.

(51) Int. Cl.$^7$ .................................................. B62D 1/18
(52) U.S. Cl. .............................. 74/493; 74/531; 280/753; 280/775; 280/777
(58) Field of Search ................... 74/493, 531; 280/753, 280/775, 777

(56) References Cited

U.S. PATENT DOCUMENTS

| | | | |
|---|---|---|---|
| 4,968,058 | * 11/1990 | Jones | 280/777 |
| 5,259,264 | * 11/1993 | Bodin et al. | 74/493 |
| 5,361,646 | * 11/1994 | Venable | 74/531 |
| 5,507,521 | * 4/1996 | Steffens, Jr. | 280/775 |
| 5,871,233 | * 2/1999 | Tanaka et al. | 280/777 |

FOREIGN PATENT DOCUMENTS 03108594   4/1991   (JP).
5-105014 * 4/1993   (JP).

* cited by examiner

Primary Examiner—Allan D. Herrmann
(74) Attorney, Agent, or Firm—Miller, Johnson, Snell & Commiskey, P.L.C.; Barry C. Kane

(57) ABSTRACT

A steering column assembly for a vehicle wherein the steering column may be adjustable in a tilt direction, telescoping direction or both. The steering column includes a first housing, a second housing pivotally coupled to one end of the first housing, and a locking assembly interconnecting the first and second housings. The locking assembly includes a clutch having one end attached to the first housing, and an opposite end in sliding engagement with the second housing. A caliper member is provided on the second housing, and extending through the clutch to selectively fix the clutch in place and thus fix the relative position of the first housing in relation to the second.

18 Claims, 11 Drawing Sheets

US 6,244,128 B1

STEERING WHEEL IMPACT POSITIONING SYSTEM

CROSS-REFERENCE TO RELATED APPLICATIONS

This application relates to and claims priority from United States provisional patent application Ser. No. 60/101,789, filed Sep. 25, 1998, the specification of which is incorporated herein by reference.

BACKGROUND OF THE INVENTION

1. Field of the Invention

This invention relates generally to steering columns, and in particular to a steering column which automatically positions itself to maximize the airbag's safety efficiency in a collision.

2. Discussion of the Related Art

On heavy duty and medium duty trucks, busses and specialty service vehicles, steering columns are generally oriented more upright than in most passenger vehicles. As a result, airbags mounted in the steering wheel tend to deploy in a more vertical direction than toward the operator. This condition can result in the operator impacting the edge of the steering column in a collision. This is unlike most passenger vehicles and light trucks where the airbag deploys between the operator and the steering wheel and greatly retards the operator's momentum in a collision.

SUMMARY OF THE INVENTION

A steering column assembly is provided for a vehicle wherein the operator can adjust the tilt angle telescopic position or both of the steering wheel to a comfortable position using a single locking mechanism. The locking mechanism includes a clutch-like assembly to provide an infinite number adjustment positions in tilt angle, telescopic position or both. An actuator device is provided in the steering column assembly which is interconnected to the locking mechanism for the purpose of tilting the steering wheel downwardly and/or collapsing the steering column in the event of a collision such that the airbag is deployed in a direction to more directly intercept and retard the forward motion of the operator toward the steering wheel.

In one form of the steering column assembly embodying the invention, an upper housing is pivotally connected to a lower housing in a manner to permit the upper housing to tilt with respect to the lower. A Y-shaped bracket including a clutch assembly interconnects another portion of the upper housing to the lower, forming a three-bar linkage. One end of the clutch assembly is interconnected to either the upper or lower housing in friction engagement so the end of the clutch can move with respect to the housing and permit angular adjustment of the first housing relative to the second. The clutch assembly is engaged and disengaged by a linkage, which in turn is actuated by a cable interconnected to a lever on the steering column.

In another form of the steering column assembly embodying the invention, a shuttle or inner housing is provided in telescopic relationship within an outer housing, and has an end pivotally coupled to a second housing of the steering column. In this embodiment the locking mechanism controls the relative tilt angle, and the telescopic position, or both of one housing relative to the other. The same linkage is provided to engage and disengage the locking mechanism fixing the steering column position.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
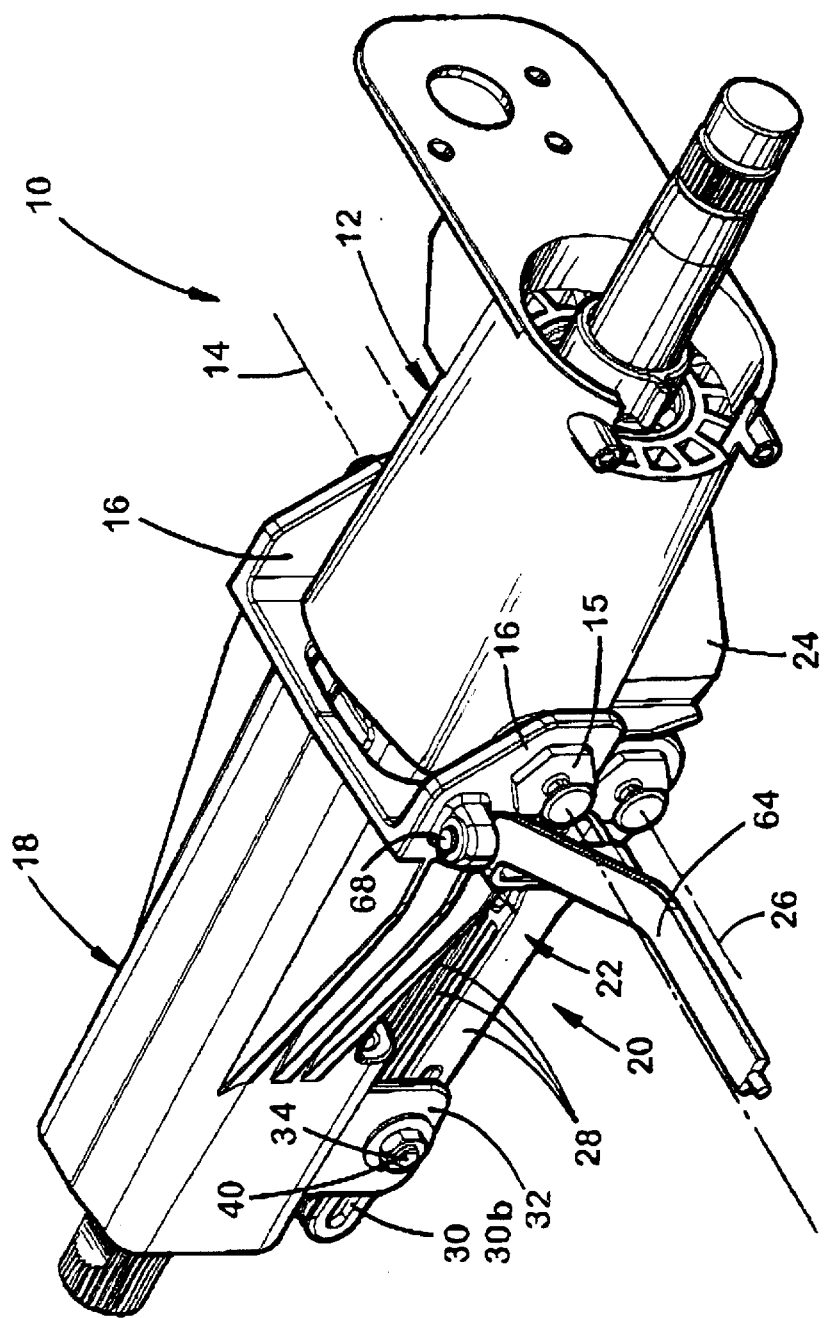
FIG. 1 is a perspective view of one form of the steering column embodying the present invention.
Figure 2:
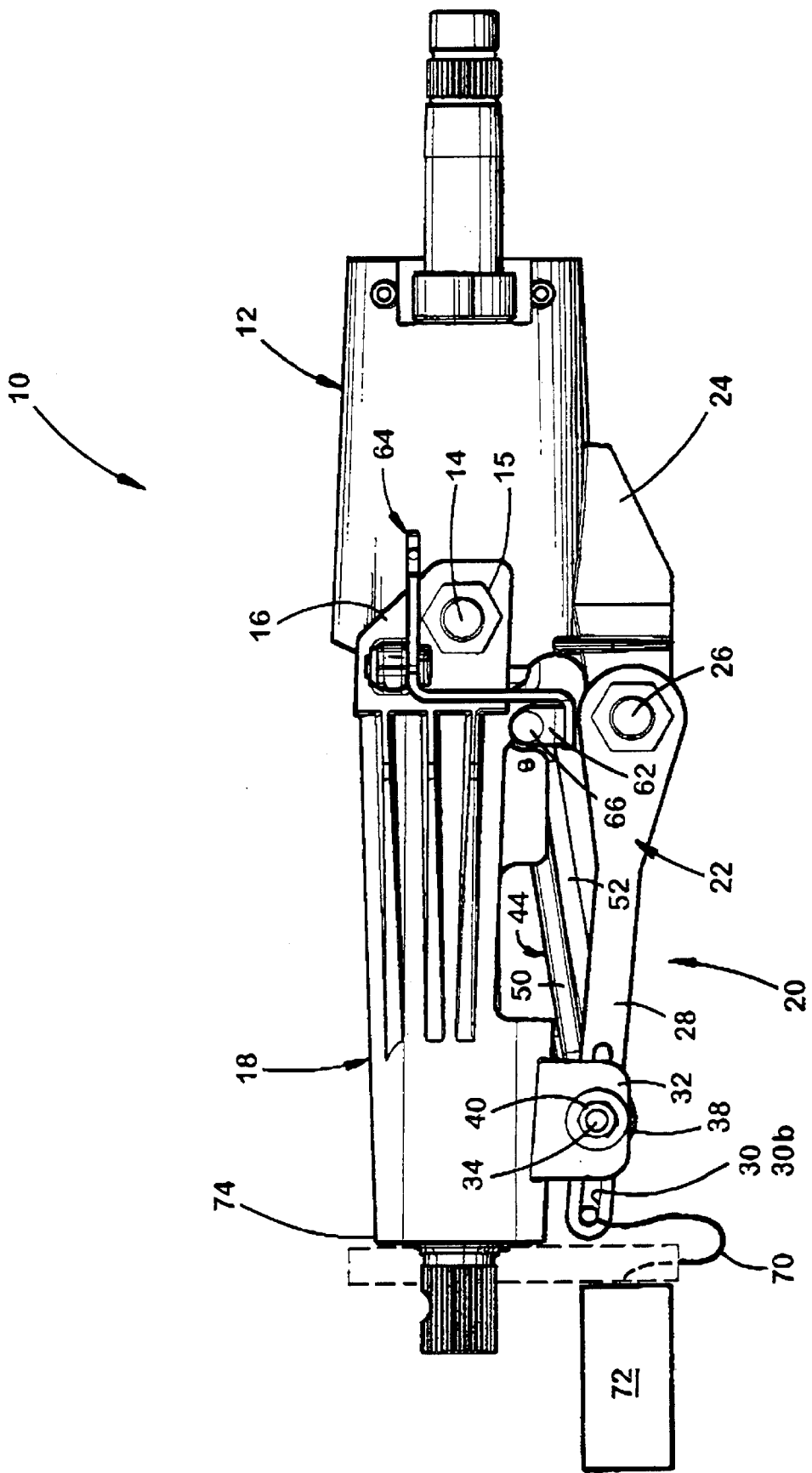
FIG. 2 is a side elevational view of the steering column assembly shown in FIG. 1.
Figure 3:
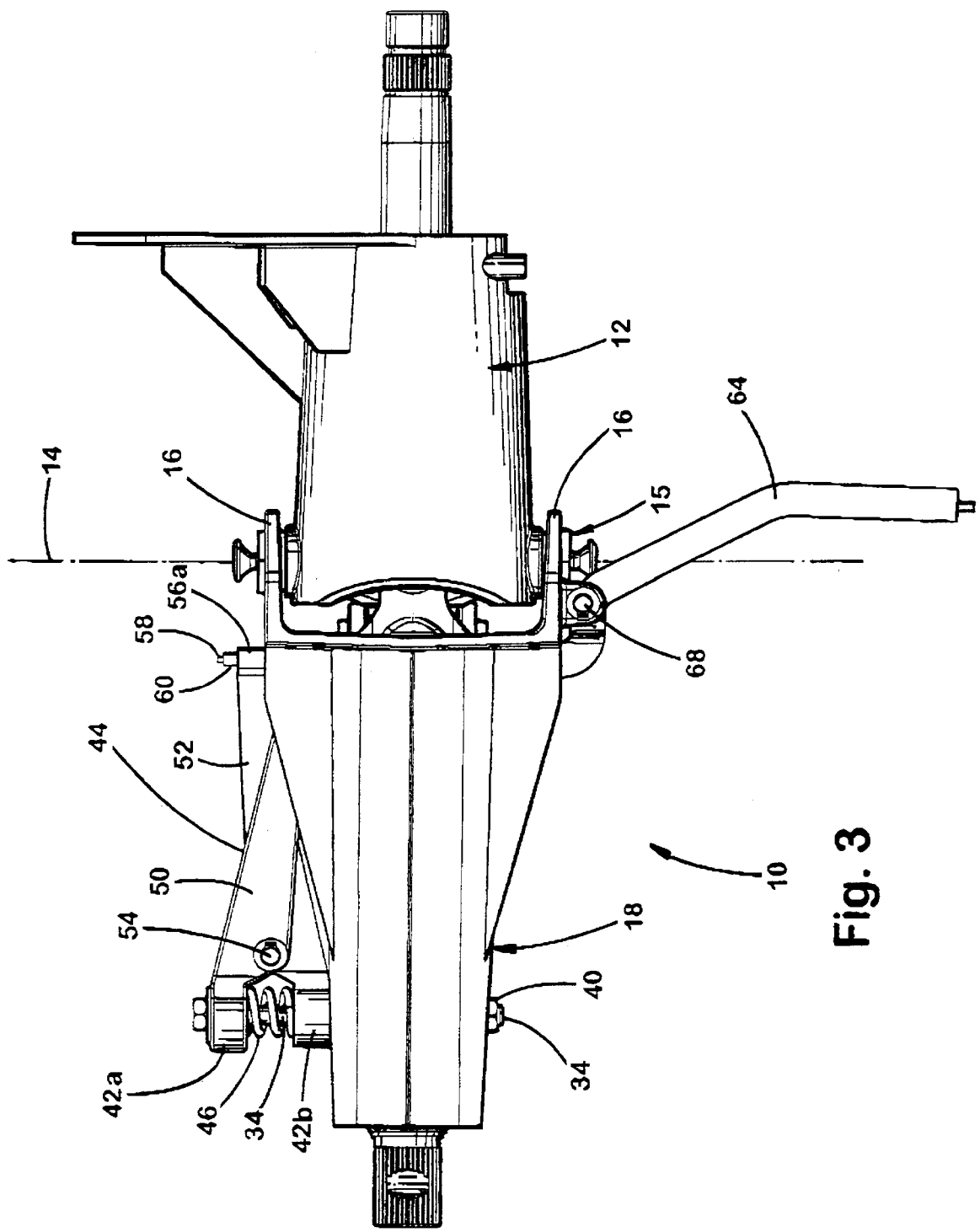
FIG. 3 is a top plan view of the steering column assembly shown in FIG. 2.
Figure 4:
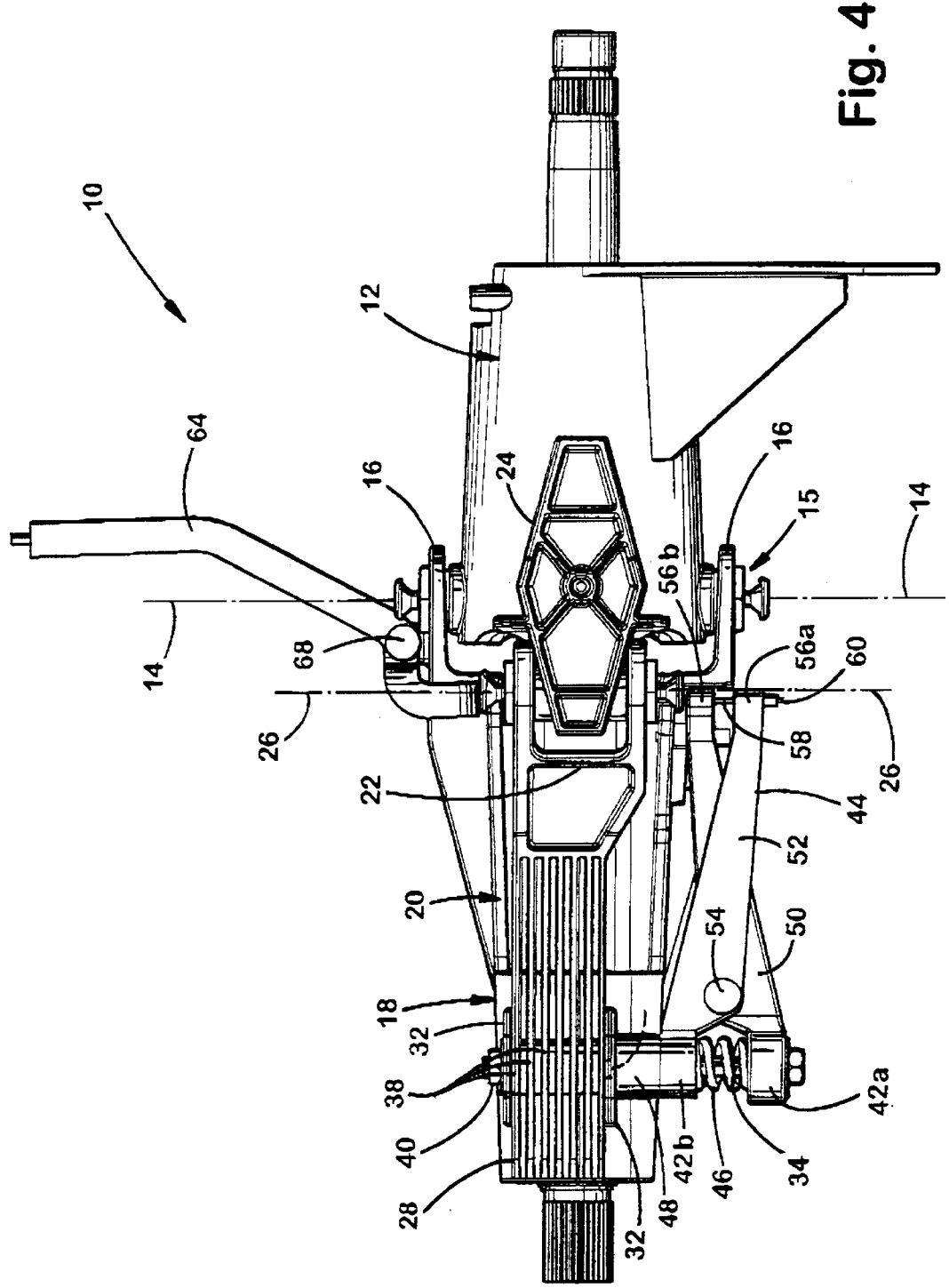
FIG. 4 is a bottom plan view of the steering column assembly shown in FIG. 3.
Figure 5:
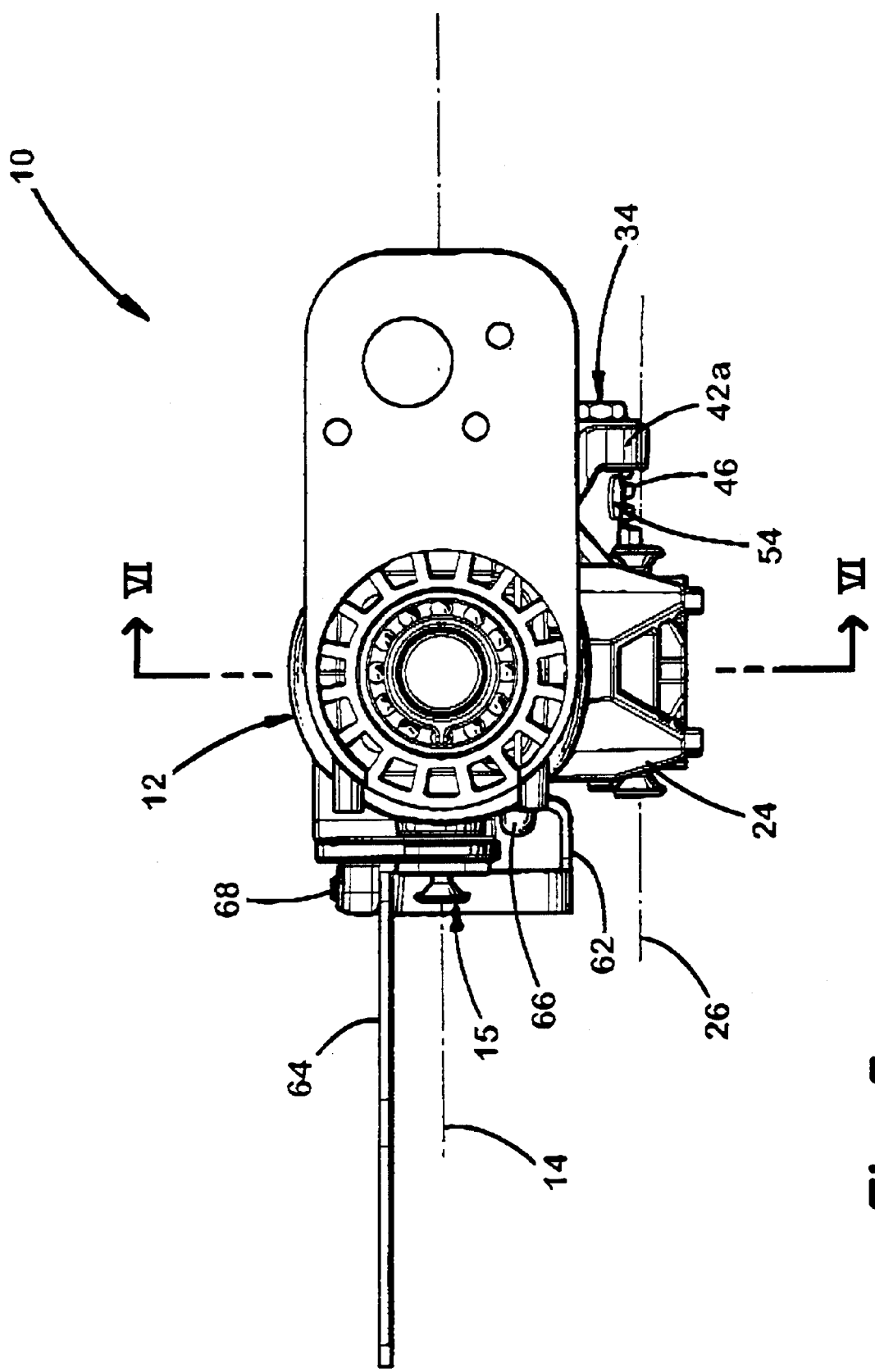
FIG. 5 is a front elevational view of the steering column assembly shown in FIG. 4.
Figure 6:
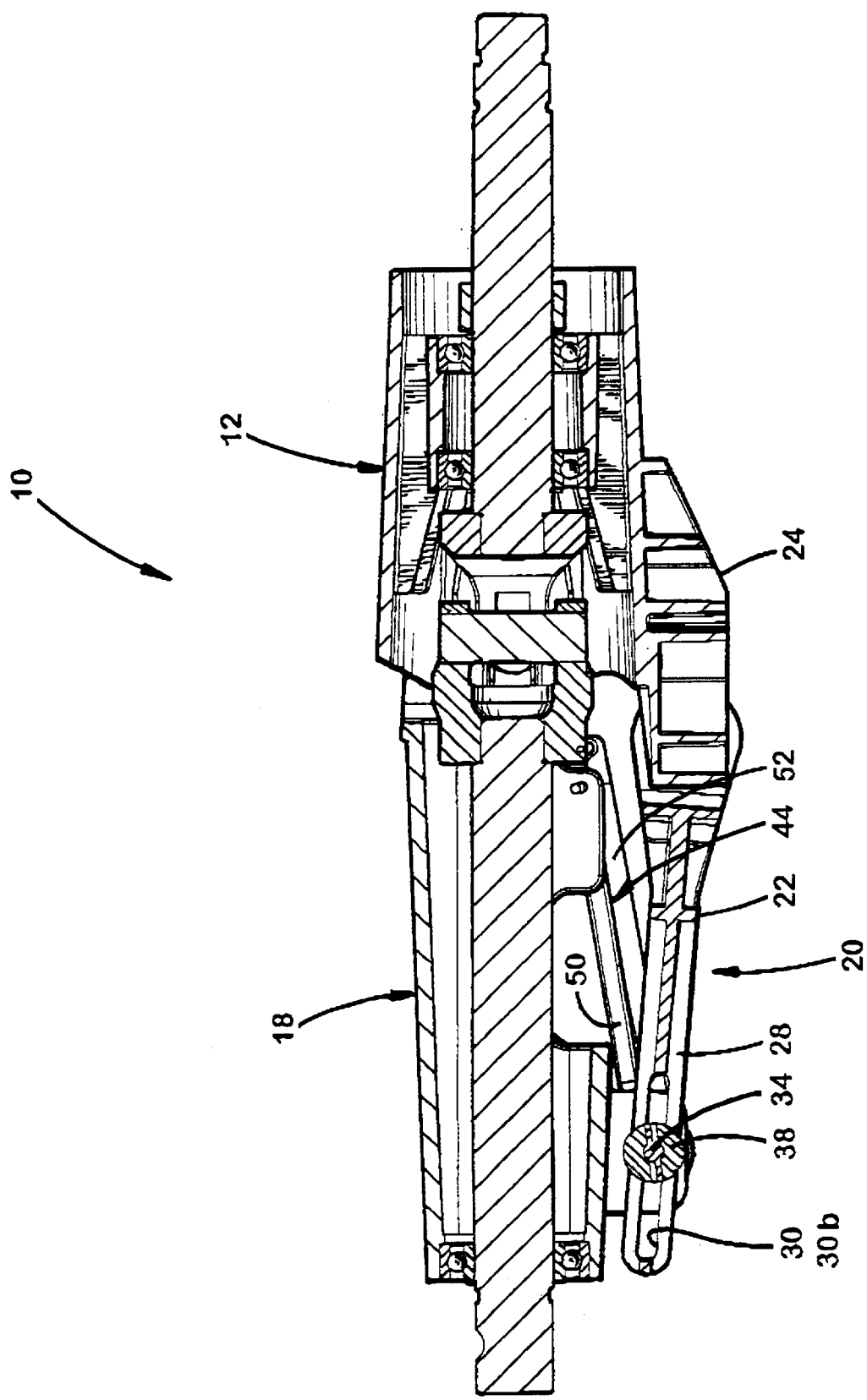
FIG. 6 is a section view of the steering column assembly shown in FIG. 5 along line VI—VI.

Referring to FIGS. 1 through 6, a first embodiment of steering column assembly 10 includes a first or upper housing assembly 12 pivotally coupled about axis 14 defined by ball-nosed bolts 15, to flanges 16 extending from a second or lower housing assembly 18. The ball coupling provided by ball-nosed bolts 15 and defining pivot axis 14 provides the principal tilt axis about which the upper housing 12 tilts with respect to the lower housing 18. The tilt angle of the upper housing 12 relative to the lower housing 18 may be changed and held in position by a locking mechanism generally identified as 20. Locking mechanism 20, also referred to as the clutch assembly, in turn is comprised of a clutch bracket 22 pivotally coupled at one end along axis 26 to an extension 24 of housing 12. Extending from an opposite side of clutch bracket 22 are a plurality of locking plates or clutch blades 28, each spaced from an adjacent blade by a predetermined distance. Each blade 28 has a longitudinal slot 30 extending therethrough which is aligned with that in an adjacent blade so as to define a transverse passageway 30b extending through all of the blades 28.

The parallel blades 28 are received between two parallel flanges 32 extending from a lower surface of the lower housing 18. In one embodiment of the invention, a bolt 34 extends through holes 36 formed in flanges 32 and through passage 30 of the blades 28 to provide a rod along which the blades 28 slide when the tilt angle of the upper housing 12 is changed. Bolt 34 also retains a plurality of washers 38, each disposed in a respective space between adjacent blades 28, wholly contained between the two flanges 32 extending from the lower housing 18. One end of bolt 34 is threaded and receives a nut 40 such as a NYLOK™ brand nut. The opposite end of the bolt 34 outboard of one flange 32 extends through adjacent ends 42a, 42b of a linkage 44 (such as a scissor or caliper) separated from each other by a biasing member 46 such as the compression spring shorten. Disposed along bolt 34 adjacent one end 42b of the linkage 44, extending through hole 36, and into engagement with the outermost blade 28 is a spacer 48.

Linkage 44 includes two arms 50, 52 shown pivotally coupled at a point 54 proximate ends 42a, 42b to increase the movement arm or leverage force on the compression spring 46. The opposite ends 56a, 56b of arms 50, 52 are configured to receive a longitudinal member or cable 58 therethrough such that a crimp 60 at the end of the cable is urged tightly against outbound side of arm 52. Cable 58 passes beneath the lower surface of the lower housing 18 to the opposite side of the assembly 10 where it passes through one end 62 of a lever 64 and held by a grommet 66. In turn, lever 64 is pivotally coupled at point 68 to the lower housing 18.

Attached to a point proximate the ends of the clutch blade 28 is a tether 70 such as a length of aircraft cable or similar strength material. See FIG. 2. The opposite end of the tether 70 is connected to a actuator assembly 72, such as for example, anyone of those described in U.S. Pat. Nos. 5,639,120; 5,728,964 or 5,590,904, or promoted by the Maintenance Council, the disclosures of which are incorporated herein by reference. In general, these types of structures are referred to as "pretensioning assemblies." Alternatively other actuators may be used including gas or hydraulic linear or rotary actuators. In the embodiment shown in the Figures, actuator assembly 72 is mounted to the lower end 74 of the lower housing 18. Alternatively, actuator assembly 72 may be attached to some other fixture in the vehicle. It is contemplated that tether 70 may be attached to clutch blades 28 in a number of ways including to a post extending transversely through the blades 28 proximate one end of passageway 30. Alternatively, tether 70 may extend to the distal end of bracket 22 relative to actuator 72 or may be connected directly to extension 24 on the upper housing. Whether connected to the proximal or distal end of bracket 22 or to the upper housing, tether 70 should be long enough not to interfere with the maximum range of tilt of the upper housing. The instant invention, unlike those in the prior art, will be lighter in weight as a result of the judicious use of engineered materials rather than steel. In one preferred embodiment, upper and lower housings 12, 18 can be made from a plastic such as VERTON™ RF700-10EM HS available from LNP. It is further contemplated that the clutch bracket 22 would be made from cast aluminum. The cast aluminum could also be used to form one or both of the housings. All other components, such as the enclosed steering column shafts, universal joint, and remaining conventional components could be made form standard materials.

In operation, the tilt position of the upper housing 12 with respect to the lower housing 18 is maintained by the friction action produced by spring 46 on the plurality of clutch blades 28 and washers 38. The compression spring 46 forces ends 42a, 42b of the linkage 44 apart which in turn places the bolt 34 in tension to cause nut 40 to exert pressure on one flange 32, and places spacer 48 in compression against the opposite flange 32. The opposing forces are then transferred to the clutch blades 28 and washers 38 to create the friction.

Upon the happening of a collision or other force sufficient to trigger the deployment of airbags and other safety measures, the pretensioner or actuator 72 is also activated to place a substantially instantaneous tension on tether 70 of sufficient force to overcome the friction exerted by the clutch in clamping assembly 20 resulting in an automatic downward swing of the steering column upper housing 12. In addition to pulling the clutch bracket 22 to change the tilt angle, tether 70 may be split such that a slightly shorter piece pulls on cable 58, or upon end 56a of the linkage to at least partially disengage the locking mechanism and permit easier, downward retraction by the other tether 70 on the clutch bracket 22. The resulting reorientation of the steering column downward positions the simultaneously deploying airbag more directly between the occupant and the steering wheel to reduce the chance of injury.

Figure 7:
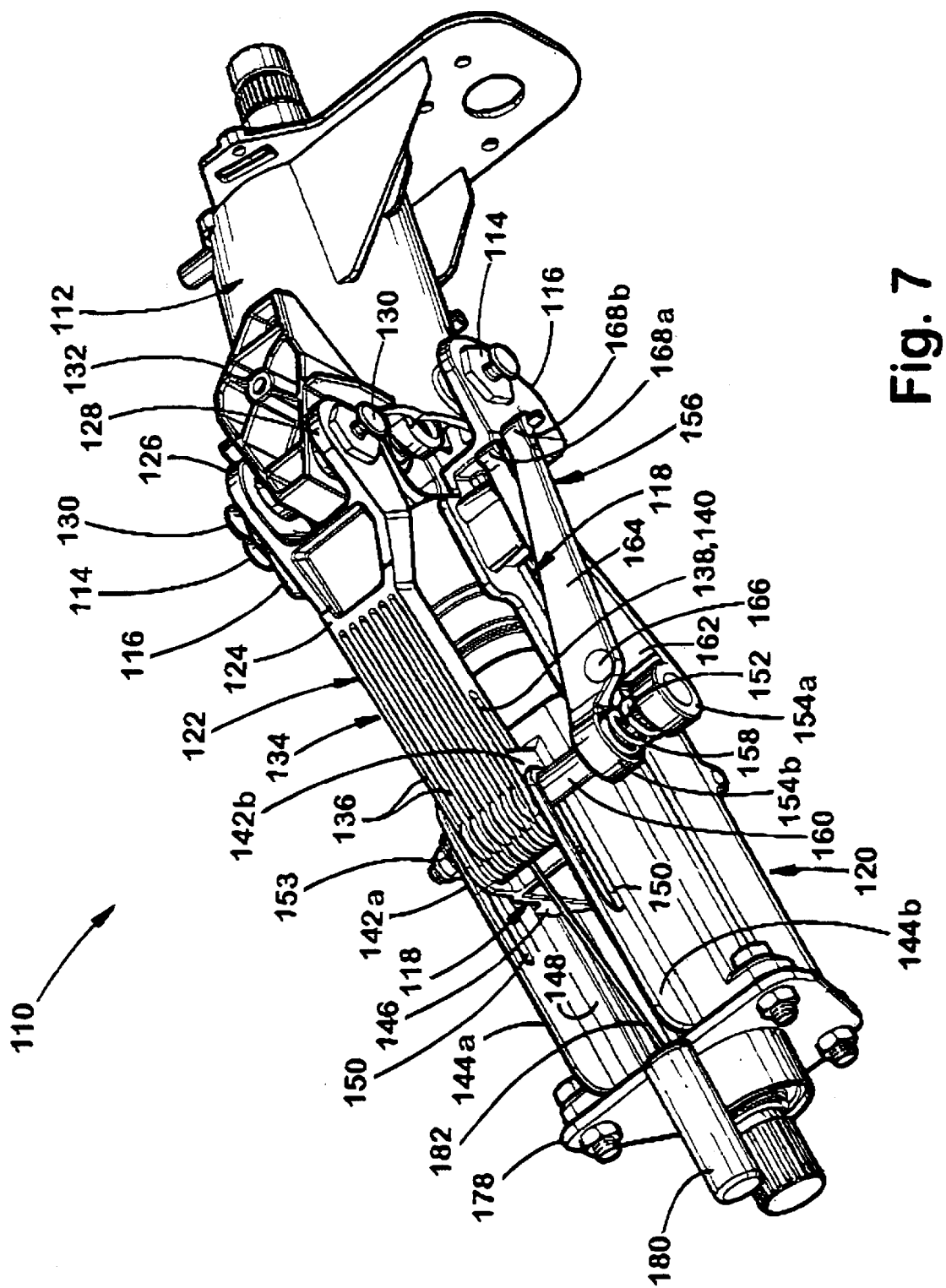
FIG. 7 is a perspective bottom view of an alternate form of the steering column assembly embodying the invention in a fully extended telescopic and upward tilt position.
Figure 8:
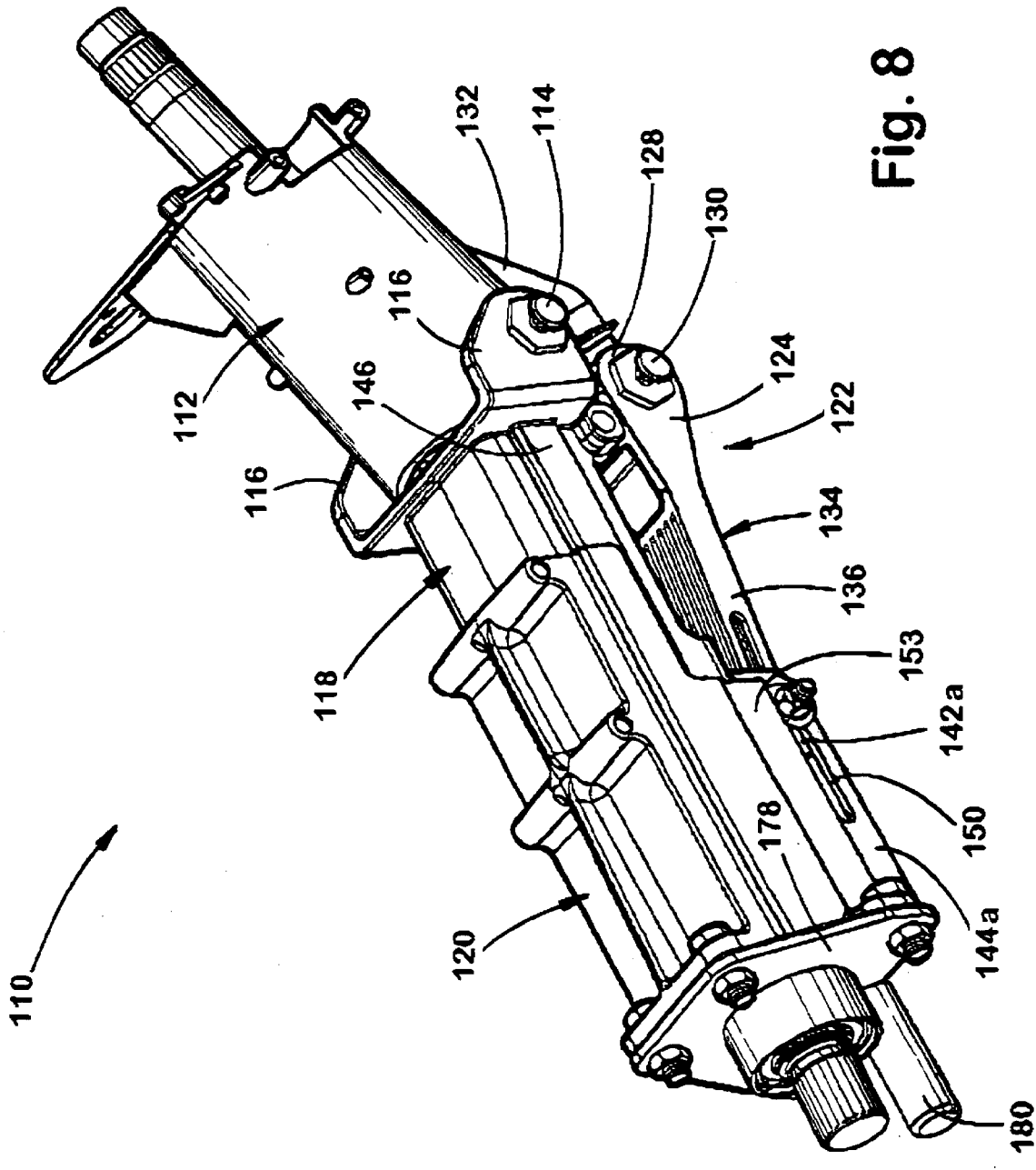
FIG. 8 is a top perspective view of the embodiment shown in FIG. 7 in a fully extended telescopic and upward tilt, and without an actuation tilt lever.
Figure 9:
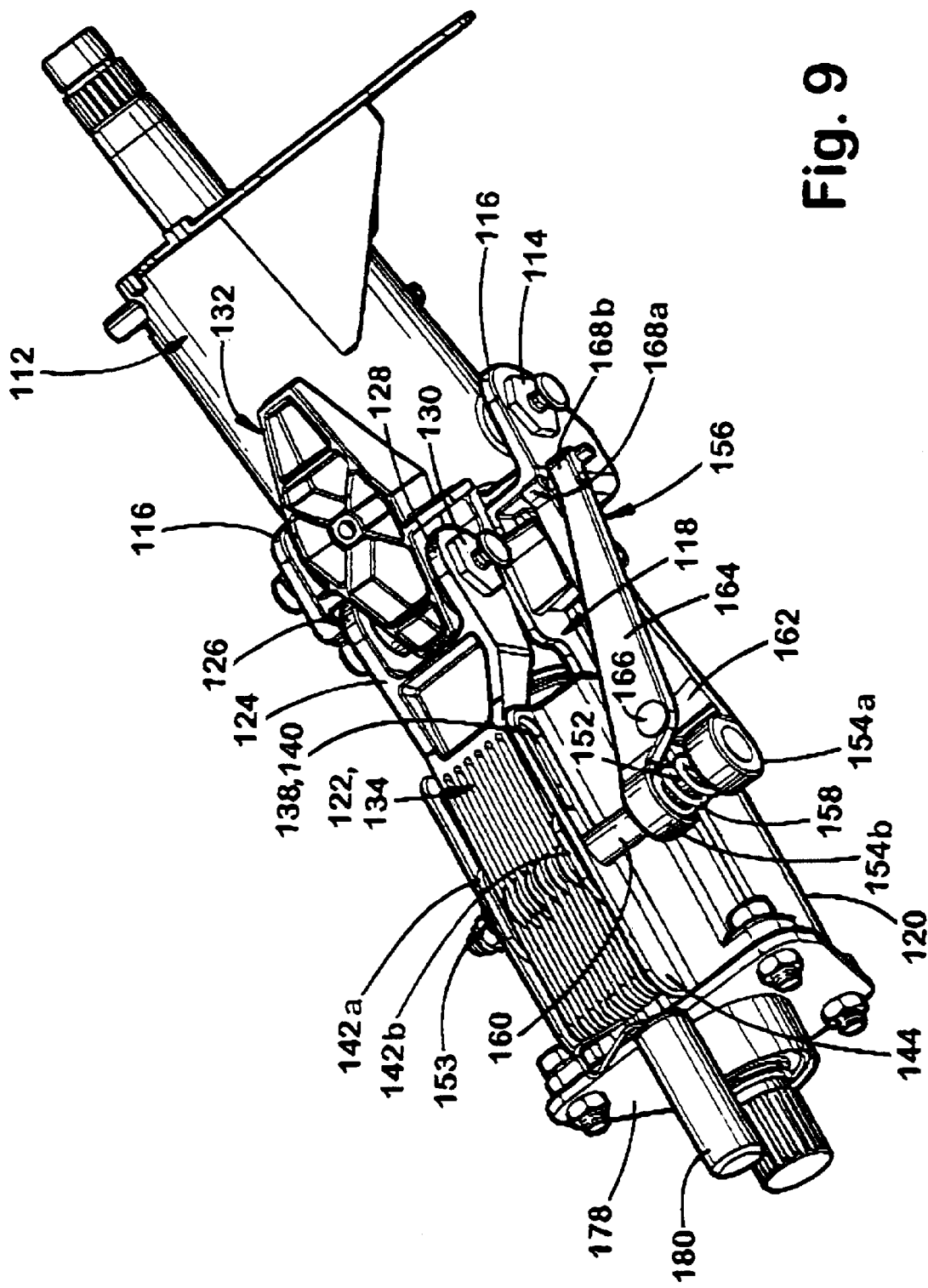
FIG. 9 is a bottom perspective view of the embodiment shown in FIG. 7 in a telescopically collapsed and full downward tilt position in normal use.
Figure 10:
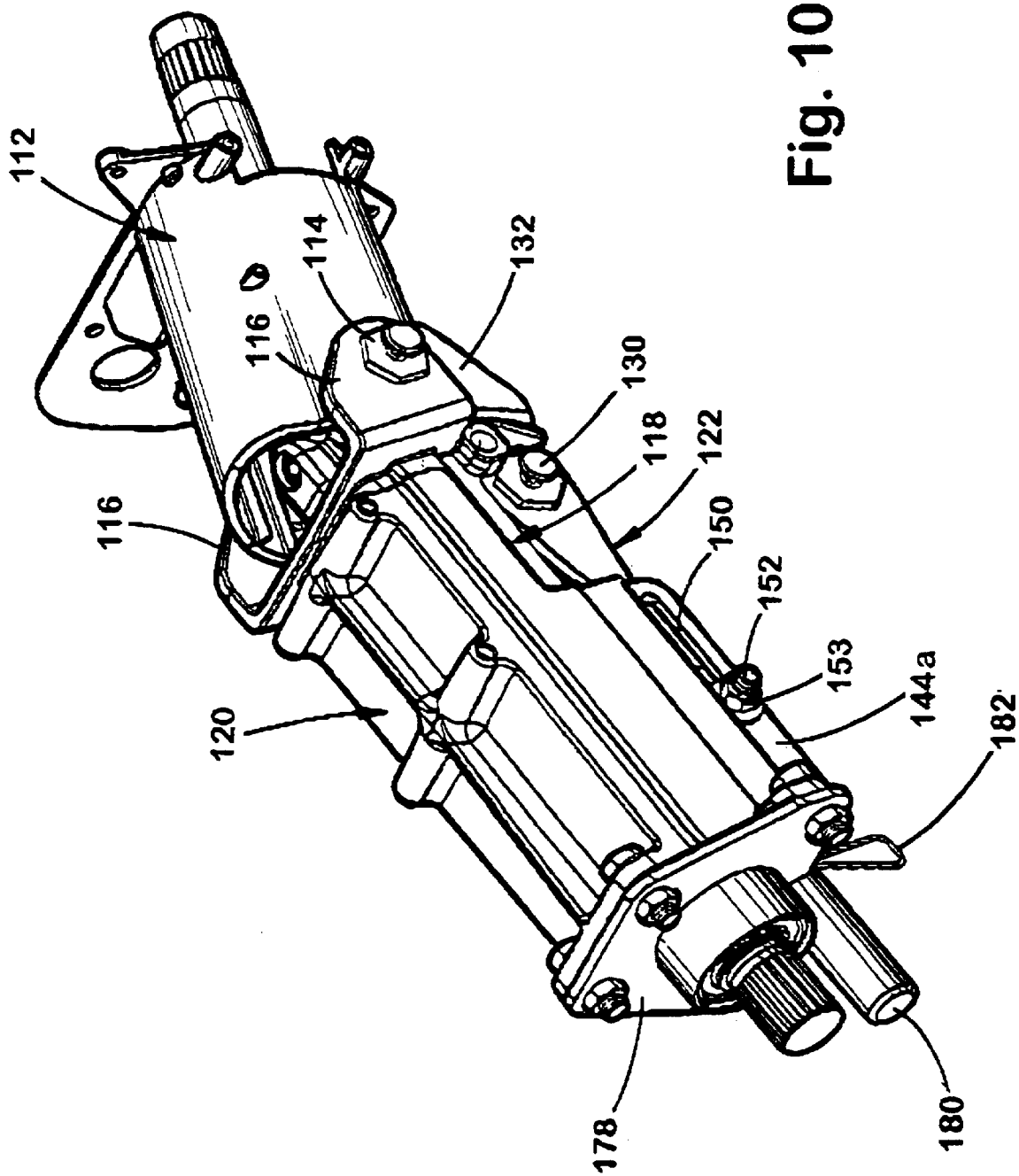
FIG. 10 is a top perspective view of the embodiment shown in FIG. 9 and in a telescopically collapsed and full downward tilt position in normal use and without an actuation tilt lever.
Figure 11:
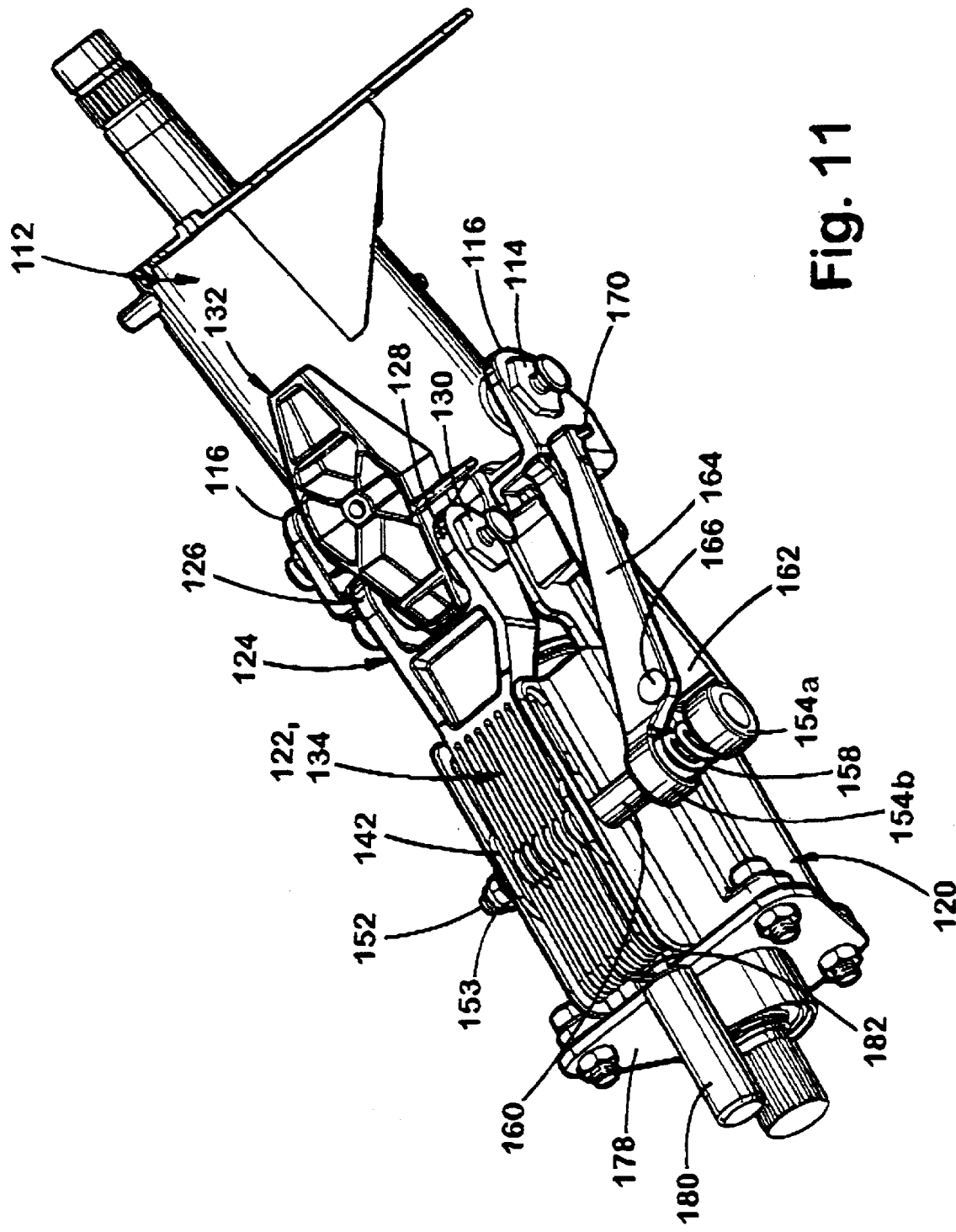
FIG. 11 is a bottom perspective view of the embodiment shown in FIG. 9, but in a telescopically collapsed and full downward tilt position after triggering of the actuator in accordance with this invention.

In an alternate embodiment of the invention, actuation of the pretensioner or actuator assembly 72 not only lowers the tilt angle of the steering wheel, but also collapses the steering column 10 away from the occupant to reduce the chance of injury in a collision. Referring now to FIGS. 7 through 11, a telescoping version of the steering column assembly 110 is shown. The assembly 110 includes an upper housing 112 pivotally coupled by a pair of ball-nosed bolts 114 to flanges 116 at the upper end of a shuttle 118. The ball-nosed bolts 114 are pre-loaded against spherically-concave features that exist as part of the upper housing 112. Shuttle 118 in turn is configured to be slidably received within a lower housing 120. Thus, the ball-nosed bolts 114 permit the upper housing 112 to tilt with respect to the lower housing 120 while shuttle 118 permits the upper housing 112 to telescope with respect to the lower housing 120. Both the relative tilt angle and telescopic extension of the upper housing 112 with respect to the lower housing 120 is controlled by a locking mechanism generally identified as 122.

Locking mechanism 122 includes a Y-shaped bracket 124 having two upper arms 126 and 128 pivotally coupled by a second set of ball-nosed bolts 130 to a pylon 132 attached to or extending from a lower surface of upper housing 112. A lower arm 134 of the Y-shaped bracket 124 is defined by a plurality of blade-shaped fingers or clutch plates 136 oriented parallel each other and separated from each other by a predetermined distance. Extending through each of the clutch plates 136, is an elongated longitudinal slot 138 aligned with similar slots in adjacent blades to define an elongated passage 140. The end of lower arm 134 and the plurality of clutch plates 136 are received between two generally upright and parallel flanges 142a, 142b extending from a portion of shuttle 118 slidably disposed within and extending from lower housing 120. Flanges 142a, 142b are in turn located inboard of flanges 144a, 144b extending from the lower surface of the lower housing 120. The parallel placement of the clutch plates 136 within flanges 142a, 142b permits lower arm 134 to slide generally freely therebetween upon a change in the relative tilt position of the upper housing 112 with regard to lower housing 120. Furthermore, the parallel arrangement of the flanges 142a, 142b immediately inboard and adjacent flanges 144a, 144b of the lower housing, together with glides 146 on shuttle 118 following channels 148 in the lower housing 120, permit shuttle 118 to telescopically translate within lower housing 120. Like clutch plates 136, flanges 144a, 144b have aligned slots extending therethrough.

Extending through slots 138, slots 150 in flanges 144a, 144b, and passage 140 is a bolt 152. Outboard of flange 144b, bolt 152 extends through adjacent ends 154a, 154b of linkage 156 separated by a compression spring 158 disposed therebetween between. Between flange 142b and the end 154b of linkage 156 and also receiving bolt 152, is spacer 160 similar to that described above. The linkage 156 is also similar to that previously described and includes two arms 162, 164 pivotally coupled at point 166 such that the lever action of ends 154a, 154b is great. The scissor action of the linkage 156 is achieved by cable 170 passing through end 168b and 168a respectively and beneath the pivotal coupling of the Y-shaped bracket 124 to the upper housing pylon 132. On the opposite side of the assembly 110, cable 170 terminates in a grommet, not shown, but similar to that described above, which in turn is retained in the end of a lever (not shown). The lever is in turn pivotally coupled to the lower housing 120.

Mounted to the end plate 178 of the lower housing 120 is an actuator 180, preferably a linear actuator, and most preferably one actuated by an expanding volume of gas produced by a pyrotechnic device such as the type used in airbag modules. The piston (not shown) within the actuator 180 is preferably connected to one end of a tether, cable, or other linkage 182 which, in turn, is connected at its opposite end to the Y-shaped bracket 124. In one example, it is contemplated that if the tether 182 were a cable, the free end could be looped around or otherwise fastened to the bolt 152 passing through passage 140. In an alternate embodiment, the free end could extend between the lower housing 120 and the lower arm 134 and be attached to the upper reaches of the Y-shaped bracket 124. A third alternative is that the tether 182 is attached directly to the pylon 132 on the upper housing 112. To increase the tensioning strength, the tether 182 may be passed through a block and tackle type assembly or similar configuration. It is further contemplated that tether 182 may be split in two wherein a second strand would be interconnected either to cable 170, to the end 168b of linkage 156, or to a release pin extending through bolt 152.

In operation, the tilt position of the upper housing 112 with respect to the lower housing 120, as well as the telescopic position of the upper housing 112 with respect to the lower housing 120, is maintained by the friction lock produced by the clutch plates 136 and washers 137 under the compression produced by bolt 152 and spring 158. The compression spring 158 disposed between the adjacent ends 154a, 154b of linkage 156 exerts a force on spacer 160 on one side of the lower arm 134 and a compressive force through bolt head 153 to the opposite side of the lower arm 134, thus urging the clutch blades 136 against the washers 137. The relative tilt or telescopic position of the upper housing 112 with respect to the lower housing 120 may be changed by the operator pulling on the lever 174 placing the cable 170 in tension and pulling the end 168b of the caliper 156. Actuation of the lever in turn causes end 154b to compress the spring 158 and release the force exerted on spacer 160 which in turn releases the clamping pressure on the clutch plates 136 against the washers 137 and allowing the operator to adjust the tilt and/or telescoping position of the steering column. The operator's release of the lever allows the compression spring 158 to expand and re-exert the friction clamp.

In a collision producing a predetermined acceleration threshold, a signal from the sensor ignites the inflator which in turn produces a gas. The gas expands rapidly and acts upon the piston within the linear actuator 180 moving it to the opposite end of the housing. The piston places the tether 182 in tension with such force that is overcomes the clamping force exerted by the clamping assembly 122 and pulls the steering column 110 telescopically inward and downward so the operator will receive the maximum benefit of the airbag. The resulting airbag deployment will better improve the operator's safety and reduce the operator's forward momentum in a crash situation.

In both of the embodiments described above, it is contemplated that the upper housings 12, 112 hold two ball bearing races which journal the steering column shafts interconnected by a universal joint. The upper housing 12, 112 is contemplated to be made from an non-metallic material which reduces cost, weight and vibrational characteristics and will include all of the necessary mounting features for a turn signal switch, hand controlled brake valve, and clock spring. Alternatively, the shaft and lower housing 18, 120 may be extended with a lower journal attached to the floor or firewall. In a preferred embodiment, the lower housing 18, 120 and the clamping assembly (clutch) 20, 122 are to be made from aluminum so that threads may be provided for the ball sockets, otherwise inserts may be provided. The advantage of this type of assembly is a latch-free, pre-loaded tilt mechanism with minimal components.

In all of the embodiments described herein, the linear actuator, and particularly the ignitor, is set off by a sensor such as an accelerometer calibrated to a set collision force for acceleration.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

We claim:

1. A steering column assembly, comprising in combination:
    a first housing assembly;
    a second housing assembly pivotally coupled to said first housing assembly along a first pivot axis said second housing having a fixed member having a longitudinal axial passage and a shuttle member slidably disposed within said fixed member and adapted to telescope between a first and second position with respect to said fixed member; and
    a clutch assembly interconnecting said first housing assembly to said second housing assembly for selectively controlling a relative orientation of said first housing assembly to said second housing assembly, said clutch assembly having one end pivotally coupled to said first housing assembly along a second pivot axis parallel to said first pivot axis, and having a second end in sliding engagement with said second housing assembly, and a caliper member attached to said second housing assembly for selectively fixing said clutch assembly relative to said second housing assembly.

2. The steering column assembly as defined in claim 1, wherein said clutch assembly includes a plurality of clutch blades arranged in parallel spaced relationship and interconnected together at said one end.

3. The steering column assembly as defined in claim 2, further comprising a plurality of locking plates disposed between said plurality of clutch blades and cooperating with said caliper for clamping against said plurality of clutch blades.

4. The steering column assembly as defined in claim 3, wherein said caliper member comprises:
    a linkage having a pair of arms pivotally coupled together proximate one end;

a biasing member disposed between said pair of arms at said one end; and a lever proximate said first housing assembly and connected to an opposite end of said pair of arms for moving said one end of said pair of arms toward each other.

5. The steering column assembly as defined in claim 1, further comprising an actuator assembly interconnecting said first and second housing assemblies.

6. The steering column assembly as defined in claim 2, further including a plurality of locking plates disposed between said plurality of clutch blades and cooperating with said caliper member for clamping against said plurality of clutch blades.

7. The steering column assembly as defined in claim 4, further comprising a rod extending through said one end of said pair of arms, said plurality of clutch blades, and said plurality of locking plates.

8. The steering column assembly as defined in claim 5, wherein said actuator assembly includes:

an actuator fixed with respect to one of said first and second housing assemblies; and a cable attached at one end to said actuator and at an opposite end to an opposite one of said first and second housing assemblies.

9. A steering column assembly, comprising in combination:

a first housing assembly including a fixed member and a concentrically received telescoping member;

a second housing assembly pivotally coupled about a first pivot axis to one end of said concentrically received telescoping member, said second housing assembly adapted to tilt about said first pivot axis relative to said first housing assembly, and with said telescoping member, translate with respect to said fixed member; and locking means coupling said first housing assembly to said second housing assembly and selectively controlling the tilt and translation of said second housing assembly relative to said first housing assembly, said locking means comprising a clutch assembly having one end pivotally coupled to one of said first and second housing assemblies along a second pivot axis parallel to said first pivot axis, and a second end in sliding engagement with an opposite one of said first and second housing assemblies, and a locking assembly coupled to said second end of said clutch assembly for selectively fixing said clutch assembly relative to said first and second housing assemblies.

10. The steering column assembly as defined in claim 9, further comprising an actuator assembly having one end attached to said second housing assembly and an opposite end attached to a fixture moving said second housing assembly from a first position to a safety position substantially instantaneously.

11. The steering column assembly as defined in claim 9, wherein said clutch assembly includes:

a plurality of parallel spaced apart blade-shaped fingers, each having a longitudinal slot extending therethrough; and a plurality of locking plates, each disposed between adjacent ones of said parallel spaced apart blade-shaped fingers, each of said locking plates having a hole extending therethrough and aligned with said longitudinal slot in each of said spaced apart blade-shaped fingers.

12. The steering column assembly as defined in claim 11, wherein said locking assembly includes:

a longitudinal member extending through said longitudinal slots in each of said plurality of parallel spaced apart blade-shaped fingers and through said hole in each of said plurality of locking plates, and having one end adjacent a portion of said first housing assembly; and a lever attached to an opposite end of said longitudinal member for selectively forcing said plurality of parallel spaced apart blade-shaped fingers against said plurality of locking plates.

13. The steering column assembly as defined in claim 9, wherein said actuator assembly includes:

a pretensioner attached to a fixed component;

a tether having one end attached to said second housing assembly, and having an opposite end attached to said pretensioner; and whereby actuation of said pretensioner substantially instantaneously places said tether in tension with a force sufficient to overcome said locking means and move said second housing to a predetermined position.

14. The steering column assembly as defined in claim 12, wherein said longitudinal member is a bolt.

15. The steering column assembly as defined in claim 12, wherein said lever includes:

a caliper having two arms pivotally coupled together proximate one end of each arm, an end of one of said two arms attached to said longitudinal member;

a biasing member disposed between said two arms for forcing one end of said arms away from the other;

a cable having one end attached to an opposite end of one of said two arms; and a lever attached to an opposite end of said cable whereby activation of said handle forces said one end of said two arms toward each other, releasing tension on said longitudinal member.

16. The steering column assembly as defined in claim 13, wherein said pretensioner includes one of a linear actuator and a rotary actuator.

17. A steering column assembly, comprising in combination:

a first housing assembly;

a shuttle pivotally coupled to said first housing assembly along a first pivot axis;

a second housing slidably receiving said shuttle axially therein and translating telescopically therein;

an adjustable locking member interconnecting said first housing assembly to said second housing assembly for selectively controlling a relative position of said first housing assembly to said second housing assembly; and a pretensioning assembly interconnecting said first and second housing assemblies, said pretensioning assembly adapted to move said first housing assembly from a first position to a second position upon a specific circumstance.

18. The steering column assembly as defined in claim 17, further comprising a ball coupling interconnecting said first and second housing assembly.

\* \* \* \* \*